US00RE43046E

(19) United States
(12) Reissued Patent
Bourgart

(10) Patent Number: US RE43,046 E
(45) Date of Reissued Patent: Dec. 27, 2011

(54) MAINTENANCE SYSTEM FOR A TELECOMMUNICATION INSTALLATION

(75) Inventor: Fabrice Bourgart, Perros Guirec (FR)

(73) Assignee: Gula Consulting Limited Liability Company, Dover, DE (US)

(21) Appl. No.: 12/393,895

(22) PCT Filed: Jun. 13, 2001

(86) PCT No.: PCT/FR01/01841

§ 371 (c)(1),
(2), (4) Date: Jul. 21, 2003

(87) PCT Pub. No.: WO01/99395

PCT Pub. Date: Dec. 27, 2001

Related U.S. Patent Documents

Reissue of:
(64) Patent No.: 7,184,711
Issued: Feb. 27, 2007
Appl. No.: 10/276,422
Filed: Jul. 21, 2003

U.S. Applications:
(63) Continuation of application No. PCT/FR01/01841, filed on Jun. 13, 2001.

(30) Foreign Application Priority Data

Jun. 23, 2000 (FR) ..... 00 08199

(51) Int. Cl.
*H04W 4/00* (2009.01)

(52) U.S. Cl. ..... 455/67.11; 455/423; 709/222; 709/224; 702/185; 702/57; 702/58; 702/59; 379/21; 375/224

(58) Field of Classification Search ..... 455/67.11, 455/423; 375/224; 702/185, 57, 58, 59; 709/222, 224
See application file for complete search history.

(56) References Cited

U.S. PATENT DOCUMENTS 4,972,453 A 11/1990 Daniel et al.
(Continued)

FOREIGN PATENT DOCUMENTS

DE 19537087 A 4/1997
(Continued)

OTHER PUBLICATIONS

International Search Report for PCT/FR01/01841 mailed Aug. 22, 2001.

(Continued)

*Primary Examiner* — Pierre-Louis Desir
(74) *Attorney, Agent, or Firm* — Schwabe, Williamson & Wyatt, P.C.

(57) ABSTRACT

The invention provides a portable and autonomous assistance device to derive information on faults in a private telecommunication installation comprising particularly equipment units to assist the client owning the installation in maintaining the latter. A maintenance session is selected in a maintenance server of the service provider managing the installation as a function of information transmitted by the assistance device so as to provide instructions in the device. The address of the server and an identifier of the equipment unit are rapidly read by means of a bar code reader which can also read bar codes in a user manual. The assistance device also serves to configure a terminal (TE) by means of a configuration session opened in a server (SFT) of the terminal manufacturer.

41 Claims, 4 Drawing Sheets

AMENDED

U.S. PATENT DOCUMENTS

| | | | |
|---|---|---|---|
| 5,095,500 | A | 3/1992 | Tayloe et al. |
| 5,619,489 | A | 4/1997 | Chang et al. |
| 5,745,049 | A | 4/1998 | Akiyama et al. |
| 6,041,288 | A | 3/2000 | Ruffolo et al. |
| 6,175,934 | B1 | 1/2001 | Hershey et al. |
| 6,385,298 | B1 | 5/2002 | Beyda et al. |
| 6,411,678 | B1 | 6/2002 | Tomlinson et al. |
| 6,438,212 | B1 | 8/2002 | Lysaght et al. |
| 6,446,058 | B1 | 9/2002 | Brown |
| 6,516,053 | B1 | 2/2003 | Ryan et al. |
| 7,092,947 | B2 | 8/2006 | Zellner et al. |

FOREIGN PATENT DOCUMENTS

| | | | |
|---|---|---|---|
| JP | 10154181 | A | 6/1998 |
| JP | 11353332 | | 12/1999 |
| WO | 0199395 | A1 | 12/2001 |

OTHER PUBLICATIONS

English Translation of International Preliminary Examination Report for PCT/FR01/01841 completed May 8, 2002.

Office Action for U.S. Appl. No. 10/276,422 mailed Mar. 13, 2006.

Notice of Allowance for U.S. Appl. No. 10/276,422 mailed Oct. 13, 2006.

Supplemental Notice of Allowability for U.S. Appl. No. 10/276,422 mailed Jan. 18, 2007.

Office Action for Japanese App. 2002-504117 mailed Aug. 24, 2010.

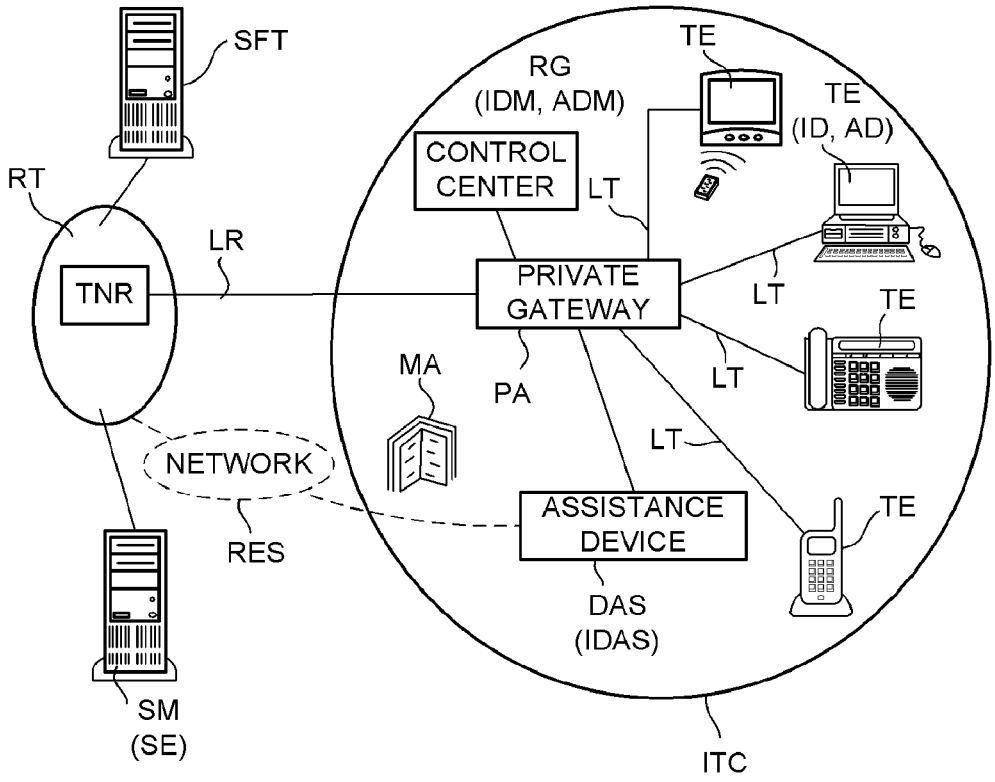
FIG. 1
AMENDED

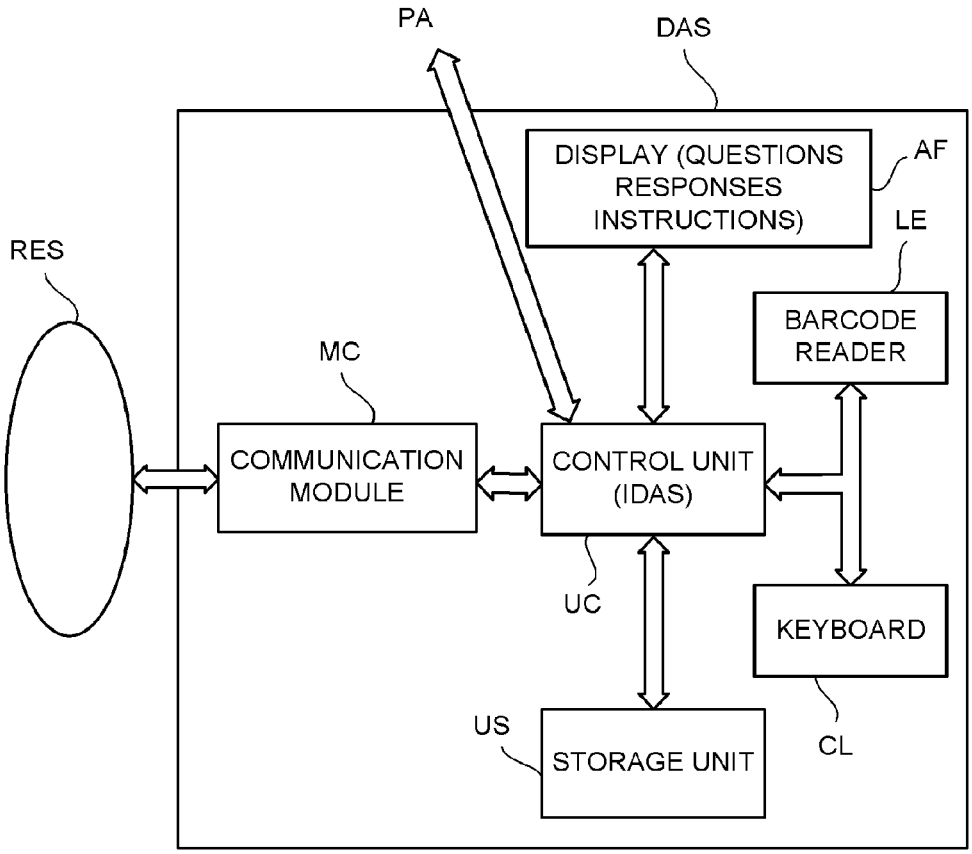
FIG. 2
AMENDED

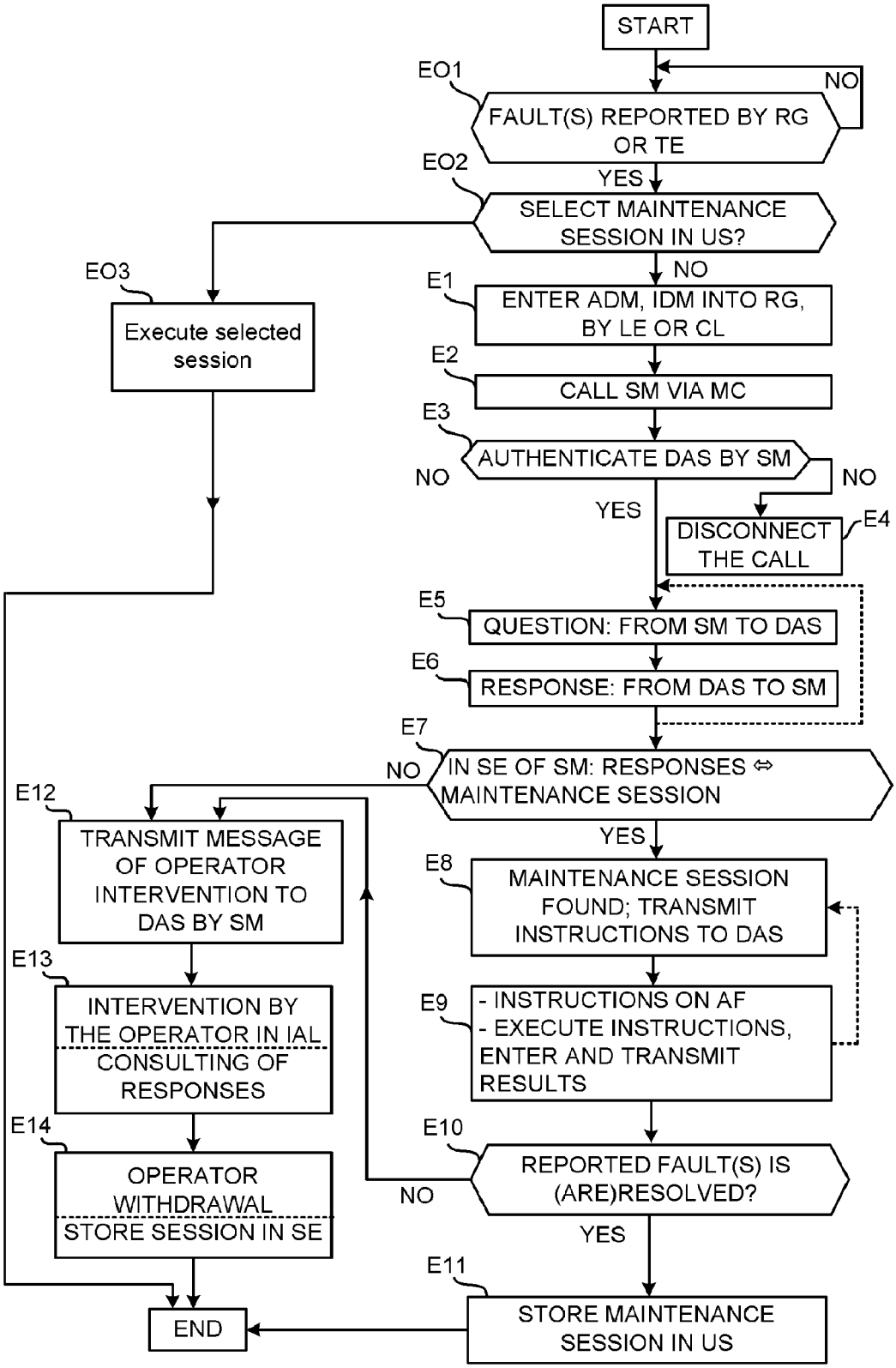
FIG. 3
AMENDED

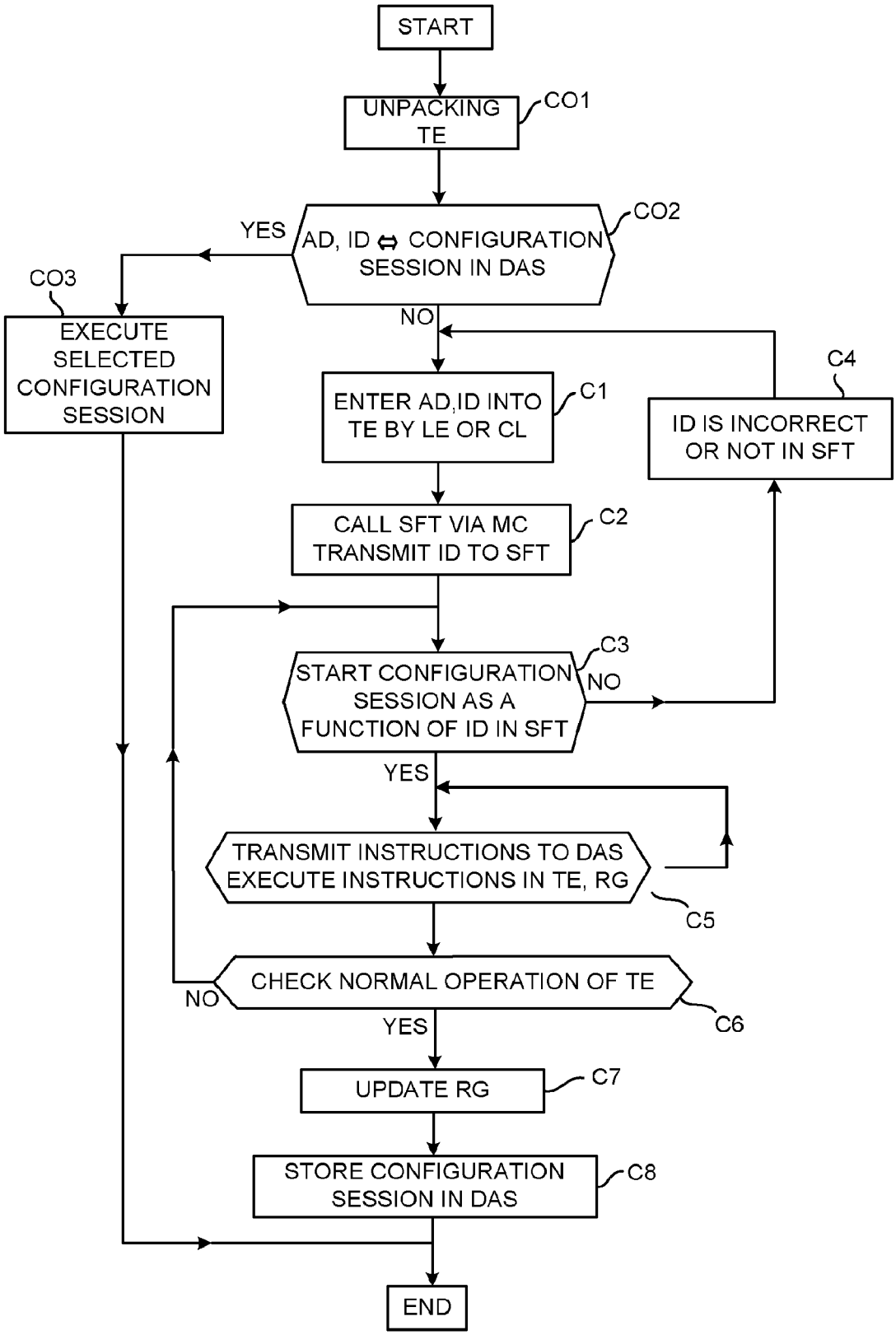
FIG. 4
AMENDED

MAINTENANCE SYSTEM FOR A TELECOMMUNICATION INSTALLATION

Matter enclosed in heavy brackets [ ] appears in the original patent but forms no part of this reissue specification; matter printed in italics indicates the additions made by reissue.

REFERENCE TO RELATED APPLICATION

This application is a continuation of the PCT International Application No. PCT/FR01/01841 filed Jun. 13, 2001, which is based on the French Application No. 00-08199 filed Jun. 23, 2000.

BACKGROUND OF THE INVENTION

1. Field of the Invention

The present invention relates generally to the operation and maintenance of a private telecommunication installation including in particular equipment units such as terminals.

The telecommunication installation is a modern installation which obviously groups together several terminals on the premises of a client having access to different operators, such as a satellite TV terminal, a microcomputer connected to the Internet network via an ADSL line, and a digital telephone set. The installation includes management means for managing the set of the equipment units in the installation, the authentication of access rights, the profiles of the users of the terminals, transcoding and adaptation at least to a network line servicing the installation.

2. Description of the Prior Art

To maintain a private telecommunication installation that is thus complex in good working order, the client can rely on a service provider to manage the installation, and therefore accepts intrusion by a third party into his private domain by disclosing details of the set of the terminals and installations installed on his premises. Although this may be tolerable in the case of campus or building type collective networks and services offered by an administrative body, known in France as a <<syndic>>, it is somewhat controversial in individual homes and in the professions.

In recent telecommunication installations, for example ISDN installations, only monitoring of the quality and the status of the terminals is carried out. However, this monitoring is effected from the local exchange and is subject to the condition that the network equipment units up to the terminals are directly connected. This constraint can no longer be regarded as the norm in a private network installation whose active life and the cycle of introducing new terminals and new applications are increasingly short.

Remote operation is used for some client networks equipped with routers and recent and complex network terminations. In a first variant, the installation is managed by personnel trained on the client's site or by a service provider who takes note of the configurations of the equipment units at the time of each modification. A second variant, relying on remote configuration or remote management of terminations, presupposes that the requested evolution concerns only software or that the intervention required at each equipment unit can be effected by the client and requires no very specific skills.

OBJECT OF THE INVENTION

The present invention aims mainly to provide a maintenance system for a private telecommunication installation which in particular respects the confidentiality of the composition of the installation whilst facilitating maintenance thereof in a manner that is autonomous for the client.

SUMMARY OF THE INVENTION

Accordingly, a maintenance system for maintaining a telecommunication installation using a maintenance server, said installation comprising equipment units, installation management means and communication means for communication between a network line and the equipment units and the management means, is characterized in that it comprises a portable assistance device for deriving information on the type of the installation and on at least one fault in the installation in order for the maintenance server to select a maintenance session as a function of the information transmitted by the assistance device and to show instructions on the assistance device.

Preferably, to prevent fastidious data entry errors, the assistance device comprises means, such as a bar code reader, for automatically entering an identifier of the installation and a telecommunication address of the maintenance server on the management means or on the communication means in order to call the maintenance server automatically as a function of the entered address, then to effect a maintenance session involving the assistance device and the maintenance server as a function of the entered identifier of the installation. The data entry means can also enter a manufacturer telecommunication address and an identifier on at least one of the equipment units automatically, in order to call a server of the manufacturer of the equipment unit automatically, as a function of the entered address, then to effect a session, involving the assistance device and the manufacturer server, for configuring the equipment unit, as a function of the entered identifier of the equipment unit.

The invention also provides a maintenance method for a telecommunication installation as defined hereinabove for implementing the maintenance system according to the invention. The maintenance method is characterized in that it comprises the following steps:

- providing a portable assistance device and a maintenance server such as defined above,
- calling the maintenance server from the assistance device,
- transmitting the information on the type of the installation and on at least one fault in the installation from the assistance device to the maintenance server,
- searching for a maintenance session in the maintenance server as a function of the transmitted information, and
- executing a maintenance session that has been found by displaying on the assistance device instructions transmitted by the maintenance server and by executing the instructions in the installation.

The invention also concerns a method of configuring an equipment unit in a telecommunication installation such as defined above, for implementing the maintenance system according to the invention. The configurating method is characterized in that it comprises the following steps:

- providing a portable assistance device such as defined above, and a server of the manufacturer of the equipment unit,
- calling the manufacturer server from the assistance device and transmitting to it an identifier of the equipment unit,
- opening a configuration session in the manufacturer server as a function of the transmitted identifier, and
- executing the configuration session by displaying instructions transmitted by the manufacturer server on the assistance device and by executing the instructions in particular in the equipment unit.

BRIEF DESCRIPTION OF THE DRAWINGS

Other features and advantages of the present invention will become more clearly apparent on reading the following description of several preferred embodiments of the invention, with reference to the corresponding accompanying drawings in which:

FIG. 1 is a schematic block diagram of a maintenance system in accordance with the invention for a telecommunication installation;

FIG. 2 is a schematic block diagram of an assistance device for use in operation and maintenance of the installation;

FIG. 3 is an algorithm for troubleshooting the telecommunication installation; and FIG. 4 is an algorithm for configuring a terminal in the telecommunication installation.

DESCRIPTION OF THE PREFERRED EMBODIMENTS

Referring to FIG. 1, a private terminal telecommunication installation ITC on the premises of a client/user essentially comprises a private network with several terminals TE distributed around the premises of the client, such as between rooms of the home of the client, a private gateway PA, constituting a communication node in the installation between terminal lines LT servicing the terminals TE and a network line LR connected to external telecommunication networks RT, and a control center RG for managing the installation ITC.

A terminal TE can be, for example, a microcomputer, a home automation control and/or monitoring device, a local server, a digital telephone set, a cable TV receiver, etc. As will emerge hereinafter, the invention handles activation and troubleshooting of the terminals TE. Each terminal is identified by an identifier ID in the form of a bar code affixed to the terminal and providing access to the identity of the manufacturer of the terminal, the terminal type and serial number, and where applicable the software version of the driver installed in the terminal.

In the installation ITC, the terminal lines LT form a star network, or a distributed network, or local loops each servicing one or more terminals. The whole or a portion of a terminal line LT is constituted by one or two pairs of metal wires or by an optical fiber. The network line LR comprises two balanced pairs of metal wires, for example, and is connected to an ISDN or ADSL network digital termination TNR, for example.

For example, the telecommunication installation ITC is analogous to a multiterminal client installation connected via the network line LR to a digital exchange of an ATM asynchronous telecommunication network described in French patent application 99-07172 filed Jun. 3, 1999, which corresponds to U.S. patent application Ser. No. 09/980,483 filed Dec. 3, 2001, which is the national phase filing from PCT Application No. WO 00/76255 filed May 29, 2000. In that installation, the gateway PA is an ATM cell replicator-router. The replicator broadcasts ATM cells from the receive channel of the network line LR to local loops constituted by the terminal lines LT, in other words copies each received network cell into each local loop. The router collects ATM cells produced by the terminals TE to [trangmit] *transmit* them on an emit channel of the network line LR, and where applicable to broadcast some cells produced by the terminals in the local loops via the replicator to provide an intercommunication facility between the terminals in the installation.

Replicator-routers are cascaded in this type of installation. The replicators and the routers comprise output couplers and input couplers for connecting the terminals TE to the gateway PA and input couplers and output couplers for connecting the gateway to the telecommunication network RT.

Moreover, a terminal TE is connected to a local loop LT via an adapter to receive broadcast ATM cells and to insert ATM cells produced by the terminal into the local loop, and to repeat cells to be forwarded to other terminals in the loop.

The replicators and the routers, and in particular the couplers in the latter, together with the terminals and their adapters, are inventoried in the control center RG as and when they are installed.

The control center RG contains a database that centralizes all information on the architecture of the installation ITC and its equipment units, such as replicators, routers, couplers, adapters and terminals. Each new equipment unit to be introduced into the installation ITC is preferably configured semi-automatically from the control center RG. The control center RG inventories the status of the current configurations of the equipment units and where applicable hosts applications in a centralized manner. For example, libraries of software are updated in the control center and enable to activate and to operate the terminals.

In other variants, the gateway PA is a private automatic branch exchange (PABX) associated with a computer server platform constituting the control center RG. The control center RG further includes in its database profile of the users of the terminals, such as their names, their functions, their geographical locations, their directory numbers, lists of the services to which they have access, etc.

More generally, the control center RG not only manages the data of the installation ITC but also participates in programming the terminals TE of the installation.

The control center RG can instead be external to the premises of the client, to which it is connected by a dedicated line, for example.

The installation ITC is associated with a portable autonomous assistance device DAS for assisting the client with operation and maintenance of the installation ITC.

As shown diagrammatically in FIG. 2, the assistance device DAS is organized around a control unit UC constituted by a microcontroller and comprises, connected to the control unit, a bar code reader LE, a keyboard CL, a display AF and a communication module MC. The device DAS is the size of a mobile radio telephone terminal or a personal digital assistant and has similar ergonomics and a man-machine interface similar to the latter.

The bar code reader LE is used to read information on at least one of the equipment units of the installation, such as the terminals TE, in order to enter automatically the identifier ID of the terminal and a telecommunication address AD of the manufacturer of the terminal, also affixed to the terminal in the form of a bar code, and to enter automatically an identifier IDM of the installation ITC and a telecommunication address ADM of a maintenance server SM, affixed in the form of bar codes to the control center RG and/or to the gateway PA.

As shown in FIG. 1, the maintenance system according to the invention comprises, in addition to the assistance device DAS, a maintenance server SM belonging to the service provider managing the installation ITC, and servers SFT belonging to manufacturers of equipment units such as the terminals. The maintenance server SM contains an expert system SE capable of selecting a predetermined maintenance session from a library of maintenance sessions as a function of information in the client's responses transmitted by the device DAS, to questions put by the server SM at the start of a maintenance procedure. Each server SFT is used to install a terminal TE or any other equipment unit from a determined manufacturer in the installation ITC, by guiding the client step-by-step by means of the device DAS, as will emerge hereinafter. The server SFT can also provide the client with drivers for the installed equipment units and troubleshooting instruction manuals specific to these equipment units.

The maintenance system according to the invention can further include other service servers for assisting the client with software applications to be installed in the terminals.

The communication module MC connects the control unit UC of the assistance device DAS to the servers SM and SFT via telecommunication networks RES as a function of the type of communication module. For example, as shown in dashed line in FIG. 1, the communication module MC communicates via a GSM radio telephone link with the servers SM and SFT and the assistance device DAS then has all the functions of a mobile radio telephone terminal. In another variant, the device DAS is equipped with a modem constituting the telecommunication module MC for providing a data link with the servers SM and SFT via the switched telephone network, and where applicable via a high bit rate network, such as the Internet, designated by the networks RES in FIG. 1.

In a further variant, which can be combined with the preceding ones, the control unit UC of the device DAS is removably connected to the gateway PA to communicate with the servers SM and SFT via the networks RT connected to the network line LR of the installation.

For example, in this latter variant, if the installation ITC operates in the mode ATM, the gateway PA reserves a virtual channel for the device DAS on the virtual path constituted by the network line LR, in the same way as for a terminal TE of the installation; a virtual channel identifier (VCI) is allocated to the assistance device DAS by the gateway PA and thus, as a general rule, constitutes a telecommunication address IDAS of the assistance device DAS for calls thereby via the network line LR.

Accordingly, because the identifier and the telecommunication address are read automatically by the reader LE, the control unit UC in the assistance device DAS automatically calls the maintenance server SM, using the address ADM that has been read, in order to participate in a maintenance procedure whose instructions appear on the display AF, or automatically calls the server SFT of the manufacturer of a terminal, using the address AD that has been read, in order to participate in a configuration procedure whose instructions appear on the display AF. Thus the displayed instructions guide the client step-by-step through troubleshooting the installation or configuring an equipment unit TE of the installation, such as a terminal. In parallel with this, the database in the control center RG updates the information collected concerning the installation ITC and the terminals TE, and preferably local applications.

The ergonomics of applications in the installation are improved by incorporating a browser into the assistance device DAS, which offers the user a graphical interface via the keyboard CL and the display AF. The ergonomics of the browser are preferably also presented by the control center RG, which is coupled to the device DAS via the gateway PA, whilst allowing limited "roaming" of the assistance device DAS so that it can obtain the addresses ADM and AD and the identifiers IDM and ID affixed in the form of bar codes on the control center RG and/or the gateway PA and equipment units such as the terminals TE. Thus the assistance device DAS preferably takes the form of a portable electronic device which is compact, self-contained and small.

To avoid excessively frequent calls to the servers SM and SFT, the assistance device DAS preferably comprises a storage unit US, for example a non-volatile memory EEPROM or a static memory RAM, for storing more frequently encountered terminal configuration sessions and maintenance sessions. Thus the storage unit US is the equivalent of a "hidden server" near the installation ITC for storing the questions/instructions—responses of session, thereby avoiding time waiting for responses from the servers SM and SFT and excessive congestion of the networks RES or RT.

To ensure the confidentiality of exchanges between the assistance device DAS and at least the maintenance server SM, an authentication of the device DAS is performed by the server SM prior to a maintenance session. For example, the device DAS holds in read-only memory a key which is supplied with a random number from the server SM to a predetermined authentication algorithm to produce a result that is transmitted to the server SM, which compares it to an equivalent result produced by the server itself. After authentication, the assistance device DAS declares itself as a client to the server SM by sending the server an identifier IDAS for the server SM to verify in a client table that the transmitted identifier corresponds to an installation for which assistance with maintenance is to be provided.

The assistance device DAS is preferably associated with a user manual MA that sets out information on maintenance procedures and fault diagnostics for the main types of installation ITC. Bar codes in the margins of the pages of the manual represent information and are readable by the reader LE so that the maintenance server SM identifies characteristics of the installation and faults of the installation or a determined equipment unit therein and proposes an interactive maintenance session made up of questions and instructions that are presented on the display AF as a function of the responses of the client/user thereby guiding the client/user step-by-step. The control unit UC can convert the instructions into commands transmitted to the control center RG.

To be more precise, and as will emerge hereinafter, prior to an interactive maintenance session, the assistance device DAS and the maintenance server SM exchange questions sent by the server to the device and responses transmitted by the client by means of the keyboard CL and/or by entering bar codes from the manual MA using the reader LE to derive information on the type of installation and on at least one fault in the installation; the server SM then searches the expert system SE for a maintenance session substantially corresponding to the responses received and transmits instructions and where applicable questions to the device DAS for display on the display AF for the client to remedy the fault as and when each instruction shown on the display is executed in the installation and the executed instruction is enabled. The questions, responses and instructions are presented in the form of menus and scrolling windows of a few lines on the display AF.

Referring to FIG. 3, troubleshooting of the installation ITC comprises the following steps E1 to E14 following an internal malfunction or a fault detected in an initial step E01 by the control center RG or by an equipment unit such as a terminal TE.

After starting up the device DAS and selecting an interactive remote troubleshooting procedure by means of the server SM from a home page on the display AF of the device DAS in a preliminary step E02, the client goes to the location of the control center RG or the gateway PA to enter the address ADM of the maintenance server SM and the identifier IDM defining the type and the characteristics of the installation ITC via the reader LE, or where applicable enters these two parameters via the keyboard CL, in step E1. The control unit UC activates the communication module MC or the gateway PA to call the server SM automatically, using the address ADM entered in step E2. After the call between the device DAS and the server SM is set up, the server SM authenticates the device DAS in step E3. Otherwise, the server SM breaks off the call with the device DAS in step E4.

In subsequent pairs of steps E5 and E6, the server SM prompts the user to enter responses via the keyboard CL or to read off responses using the reader LE to respective questions shown on the display AF in a running manner that depends on the identifier IDM that has been entered. The responses are produced by means of the keyboard CL and preferably by means of bar codes read by the reader LE from the equipment units of the installation and the user manual MA.

The expert system SE in the server SM looks for an interactive maintenance session substantially corresponding to the faults and problems indicated in the responses transmitted by the device DAS in step E7. If a maintenance session is found, the server SM transmits first instructions to the device DAS in step E8. The instructions are shown on the display AF in the device DAS in step E9. The client executes the instructions in the installation, validates them and where applicable transmits further information to the server SM as a function of the results of the instructions executed. The results are forwarded to the expert system SE in order for it to transmit other instructions to the device DAS if necessary, to guide the client step-by-step through remedying the reported fault or faults in the installation or in a determined equipment unit thereof.

If at the end of the maintenance session, in step E10, the reported fault or faults have disappeared, the client is prompted to save the preceding maintenance session in the storage unit US, or instead in the control center RG, in step E11. Session saved in the device DAS in this way can subsequently be selected, inside the installation, for a fault analogous to the previous fault, without communicating with the server SM, as indicated in a step E03 following on from the preliminary step E02 in FIG. 3.

If in step E7 the expert system SE cannot find a maintenance session matching the responses relating to the characteristics and to at least one fault of the installation, or if the reported fault or faults have not disappeared in step E10, the server SM transmits a message to the assistance device DAS in step E12 to prompt the client to make an appointment with an operator of the service provider managing the installation ITC. On subsequent intervention by the operator in step E13, the operator has the responses transmitted to the server SM and preferably stored in memory in the storage unit US during the preceding steps E6 and E9 to establish a more efficient troubleshooting diagnosis. Following the troubleshooting in step E14, on returning to the site of the server SM, the operator can enhance the expert system SE by integrating, where applicable, a maintenance session corresponding to the troubleshooting that he has effected for the installation ITC.

Installing a new equipment unit, such as a new terminal TE, in the client terminal installation ITC essentially comprises steps C1 to C8 of the algorithm shown in FIG. 4, after unpacking the new terminal TE in an initial step C01 and selecting an interactive remote configuration procedure from a home page in a preliminary step C02.

The telecommunication address AD of the manufacturer of the terminal TE and the identifier ID of the characteristics of the terminal TE are entered by means of the reader LE, or the client enters the parameters AD and ID via the keyboard CL, if the terminal does not yet have any bar codes, in the first step C1. Then, via the communication module MC or via the gateway PA, the control unit UC in the assistance device DAS automatically triggers a call to the server SFT of the manufacturer of the terminal TE, using the telecommunication address AD that has been entered, in step C2.

After setting up a call between the device DAS and the server SFT, an interactive configuration session involving the device DAS and the server SFT is opened by the server SFT, as a function of the identifier ID that has been entered, in step C3. If the identifier ID is incorrect, or if there is no configuration session that corresponds to the identifier ID, the server SFT prompts the client to enter the identifier ID again, in step C4, and returns to step C1, unless the client decides to abbreviate the procedure for installing the terminal.

Opening the configuration session in step C3 leads to the transmission of instructions from the server SFT to the device DAS, where they are shown on the display AF, and conversely transmissions of information or results from the device DAS to the server SFT in response to the instructions executed or to questions put by the server SFT, in step C5. During the configuration session, the client installs the terminal TE in the installation ITC, for example using a standard session or a session that has been personalized by selecting configuration options, terminal user profiles, drivers to be installed in the terminal, etc. In particular, drivers can be downloaded from the server SFT into the control center RG of the installation ITC via the networks RT and the gateway PA. At the end of the session, the server SFT guides the client through various tests for checking that the installed terminal TE is operating correctly, in step C6. If the result of any test is unsatisfactory, the server SFT returns to the configuration session opening step, in step C3, to transmit again instructions corresponding to the incorrect result of one of the tests.

If the terminal TE operates satisfactorily after the tests of step C6, the device DAS triggers updating of the database holding the details of the equipment units of the installation in the control center RG, and in particular introduces into the database all the characteristics concerning the operation and location of the terminal TE, in step C7.

Finally, in step C8, the client triggers saving of the configuration session for the new terminal TE in the storage unit US of the assistance device DAS, or instead in the control center RG, in order to select subsequently said session in correspondence with the address AD and a portion of the identifier ID for another terminal to be configured that is similar to the preceding terminal, as indicated by a step C03 following on from the preliminary step C02 in FIG. 4.

I claim:

1. A maintenance system for maintaining a telecommunication installation using a maintenance server, said installation comprising equipment units, an installation management arrangement and a communication arrangement for communication between a network line and said equipment units and said management arrangement, said system comprising a portable assistance device that can be located in the installation, and can be moved between different telecommunication installations, but is autonomous with respect to the installation where the portable assistance device is located for entering (i) an identifier of said installation and a telecommunication address of said maintenance server on at least one of said management arrangement and said communication arrangement to enable calling of said maintenance server as a function of the entered address and (ii) information on at least one fault in the installation to enable said maintenance server to select a maintenance session as a function of said entered identifier of said installation and said fault information transmitted by said assistance device and to transmit instructions to said assistance device which shows the transmitted instructions to be executed in said installation.

2. A maintenance system according to claim 1, wherein said assistance device is associated with a manual setting out maintenance procedures associated with information, said information being represented by bar codes that can be read by said entering means.

3. A maintenance system according to claim 1, wherein said assistance device is connected to said communication arrangement, and said communication arrangement is arranged to allocate a telecommunication address to said assistance device for calls thereby via said network line.

4. A maintenance system according to claim 1, wherein said assistance device has functions of a mobile radio telephone terminal to enable the assistance device to communicate with said maintenance server via a radio telephone link.

5. A maintenance system according to claim 1, wherein said assistance device is equipped with a modem to enable the assistance device to communicate with said maintenance server via a data link.

6. A maintenance system according to claim 1, wherein said assistance device is arranged for automatically entering an equipment unit identifier and a manufacturer telecommunication address on at least one of said equipment units to enable the assistance device to call a server of the manufacturer of said equipment unit automatically as a function of the entered address and then to effect a session, involving said assistance device and said manufacturer server, for configuring said equipment unit as a function of the entered identifier of said equipment unit.

7. A maintenance system according to claim 1, wherein said assistance device includes a browser.

8. A maintenance system according to claim 1, including a store for storing sessions.

9. A method of maintaining a telecommunication installation using a maintenance server, said installation comprising equipment units, an installation management arrangement and communication arrangement for communication between a network line and said equipment units and said management arrangement, said method being performed with the aid of a portable assistance device that can be located in different installations and comprising: causing the portable assistance device to be brought to the installation, then entering, information about the type of said installation and about at least one fault in said installation calling said maintenance server from said assistance device, transmitting said information from said assistance device to said maintenance server and receiving said information at said maintenance server, searching for a maintenance session in said maintenance server as a function of the transmitted and received information, and causing the maintenance server to execute a maintenance session that has been found by displaying on said assistance device instructions transmitted by said maintenance server and by executing said instructions in said installation.

10. A method according to claim 9, further comprising[, before all of said aforementioned steps,] entering an identifier of said installation and a telecommunication address of said maintenance server on said installation management arrangement or communication arrangement by using a bar code reader.

11. A method according to claim 9, further comprising, after [the step of] executing said maintenance session, saving said maintenance session in said assistance device or management arrangement, *and* selecting said saved session subsequently if said installation is subject to a fault analogous to said fault.

12. A method according to claim 11 further including selecting said session subsequently if said installation [Is] *is* subject to a fault analogous to said fault.

13. The method of claim 9 wherein the method is performed with the same portable assistance device at different installations at different times as a result of the portable assistance device being brought to the different installations.

14. A method of configuring an equipment unit in a telecommunication installation including an installation management arrangement and a communication arrangement for communication between a network line and equipment units and said management arrangement, the manufacturer of the equipment unit having a server, the method being performed with the aid of a portable assistant device that can be located on different installations and comprising: bringing the portable device to the installation, then calling said manufacturer server from said assistance device and transmitting an identifier of said equipment unit from said assistance device to said manufacturer server and receiving the identifier of said equipment unit at said manufacturer server, opening a configuration session in said manufacturer server as a function of the transmitted and received identifier, and executing said configuration session by displaying on said assistance device instructions transmitted by said manufacturer server and by executing said instructions.

15. A method according to claim 14 wherein said equipment unit executes said instructions.

16. A method according to claim 14, further comprising[, before any of said aforementioned steps,] entering said identifier of said equipment unit and a telecommunication address of said manufacturer server on said equipment unit, by using a bar code reader.

17. A method according to claim 14, further comprising updating a database in said management arrangement as a function of operating and location characteristics of said equipment unit, after a test indicates correct operation of said equipment unit.

18. A method according to claim 14, further comprising, after executing said configuration session, saving said configuration session in said assistance device or management arrangement, and selecting said saved session subsequently for another equipment unit analogous to said equipment unit that is to be configured.

19. The method of claim 14 wherein the method is performed with the same portable assistance device at different installations at different times as a result of the portable assistance device being brought to the different installations.

*20. A client device, comprising:*

*a communication module configured to communicatively connect the client device to a maintenance server;*

*a control unit coupled to the communication module and configured to provide to the maintenance server, information on at least one fault in a telecommunication installation; and*

*a display unit coupled to the control unit and configured to display fault-correcting instructions usable to correct the at least one fault, wherein the fault-correcting instructions are received from the maintenance server in response to the information on at least one fault, wherein the client device is a transportable device that is movable between different telecommunication installations and is configured to connect to the maintenance server after being brought to a particular telecommunications installation.*

*21. A maintenance server, comprising:*

*a storage medium;*

*a plurality of instructions stored on the storage medium that if executed cause the maintenance server to:*

*receive, from a client device, information on at least one fault in a telecommunication installation;*

*retrieve fault-correcting instructions based at least on the information on at least one fault; and*

*transmit, to the client device, the fault-correcting instructions to be displayed on the client device, wherein the client device is a transportable device that is movable between different telecommunication installations and is configured to provide information on the at least one fault in the telecommunication installation after being brought to the telecommunications installation.*

*22. A method, comprising:*

*bringing a remote assistance device to a particular telecommunication installation, the remote access device being locatable at different telecommunication installations;*

*establishing a connection by the remote assistance device with a maintenance server;*

*transmitting by a control unit of the remote assistance device to the maintenance server, information on at least one fault in the telecommunication installation; and*

*displaying on a display unit of the remote assistance device, fault-correcting instructions usable to correct the at least one fault, wherein the fault-correcting instructions are received from the maintenance server in response to the information on at least one fault.*

*23. A method, comprising:*

*causing a client device to be brought to a telecommunication installation, the client device being locatable at different telecommunication installations;*

*receiving by a maintenance server, from the client device, information on at least one fault in the telecommunication installation;*

*retrieving by the maintenance server, fault-correcting instructions usable to correct the at least one fault, wherein the fault-correcting instructions are based at least on the information on at least one fault; and*

*transmitting to the client device, the fault-correcting instructions to be displayed by the client device.*

*24. The client device of claim 20, wherein the communication module is equipped to communicate in accordance with a Global System for Mobile communications (GSM) protocol.*

*25. The client device of claim 20, wherein the communication module comprises a modem configured to communicate with the maintenance server.*

*26. The client device of claim 20, wherein the maintenance server is a manufacturer server of a manufacturer of the client device.*

*27. The client device of claim 26, wherein the manufacturer server is configured to provide instructions to be displayed by the client device for installation of new equipment in the telecommunication installation.*

*28. The client device of claim 20, further comprising a barcode reader configured to read identification information from equipment installed in the telecommunication installation.*

*29. The client device of claim 20, further comprising a web browser configured to be used as a user interface.*

*30. The client device of claim 20, wherein the control unit is configured to automatically establish a communication session with the maintenance server.*

*31. The client device of claim 20, further comprising a storage device, wherein the storage device is configured to store frequently used fault-correcting instructions provided by the maintenance server.*

*32. The maintenance server of claim 21, further comprising an expert system configured to find the fault-correcting instructions corresponding to the information on at least one fault.*

*33. The maintenance server of claim 32, wherein the expert system is further configured to be updated with new fault-correcting instructions for future use.*

*34. The maintenance server of claim 21 further configured to authenticate the client device to communicate with the maintenance server.*

*35. The maintenance server of claim 21 further configured to communicate with the client device using a virtual communication channel.*

*36. The method of claim 22, further comprising:*

*reading, using a barcode reader, a barcoded ID of equipment installed in the telecommunication installation; and*

*transmitting the barcoded ID to the maintenance server.*

*37. The method of claim 22, wherein connecting a remote assistance device to a maintenance device comprises using Global System for Mobile communications (GSM) protocol to communicatively connect the remote assistance device to the maintenance server.*

*38. The method of claim 22, wherein connecting a remote assistance device to a maintenance device comprises automatically establishing a communication session with the maintenance server by the remote assistance device.*

*39. The method of claim 22, wherein connecting a remote assistance device to a maintenance device comprises using a Virtual Channel Identifier (VCI) as a telecommunication address.*

*40. The method of claim 23, further comprising using an expert system included in the maintenance server to find the fault-correcting instructions based at least on the information on at least one fault.*

*41. The method of claim 23, further comprising authenticating the client device to communicate with the maintenance server.*

* * * * *

UNITED STATES PATENT AND TRADEMARK OFFICE

CERTIFICATE OF CORRECTION

PATENT NO. : RE43,046 E
APPLICATION NO. : 12/393895
DATED : December 27, 2011
INVENTOR(S) : Bourgart It is certified that error appears in the above-identified patent and that said Letters Patent is hereby corrected as shown below:

In Column 9, Lines 46-47, in Claim 9, delete "entering, information" and insert -- entering information --, therefor.

Signed and Sealed this
Twenty-eighth Day of August, 2012

David J. Kappos

David J. Kappos
*Director of the United States Patent and Trademark Office*